(12) United States Patent
Lin et al.

(10) Patent No.: US 7,775,784 B2
(45) Date of Patent: Aug. 17, 2010

(54) LIGHT-EMITTING DIODE PACKAGING APPARATUS, MOLD BASE AND SUPPORTING MEMBER THEREOF

(75) Inventors: Ming-Te Lin, Hsinchu Hsien (TW); Ming-Yao Lin, Hsinchu (TW); Kuang-Yu Tai, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 595 days.

(21) Appl. No.: 11/802,883

(22) Filed: May 25, 2007

(65) Prior Publication Data

US 2008/0063738 A1 Mar. 13, 2008

(30) Foreign Application Priority Data

Sep. 13, 2006 (TW) .............................. 95133809 A

(51) Int. Cl.
 *H01L 21/56* (2006.01)
(52) U.S. Cl. ........................... 425/121; 249/93; 249/94; 249/119; 249/120; 257/666; 257/670
(58) Field of Classification Search ................... 249/85, 249/91, 93, 94, 120, 119; 425/117, 121; 264/272.14, 272.15; 257/666, 670, 675
See application file for complete search history.

(56) References Cited

U.S. PATENT DOCUMENTS 1,688,888 A * 10/1928 Spreen ........................ 249/120
3,941,532 A * 3/1976 Fennessy et al. .............. 249/85
4,486,364 A * 12/1984 Takahashi .................... 249/85
7,315,046 B2 * 1/2008 Komoto et al. ................ 257/81

FOREIGN PATENT DOCUMENTS

| JP | 09102511 A | * | 4/1997 |
|---|---|---|---|
| TW | 326250 | | 7/1984 |
| TW | 343036 | | 4/1986 |
| TW | M285041 | | 8/1994 |

* cited by examiner

*Primary Examiner*—Robert B Davis
(74) *Attorney, Agent, or Firm*—Birch, Stewart, Kolasch & Birch, LLP

(57) ABSTRACT

A light-emitting diode packaging apparatus is disclosed, which is used for a supporting member having a plurality of supporting pieces to be inserted therein for the subsequent molding and packaging operations, including a mold base for a plurality of supporting pieces of a supporting member to be inserted therein, and a controller for inserting into the mold base and positioning the supporting member. This invention features forming a positioning foot at the periphery of at least one electrode pin of each of the supporting pieces, and also forming a corresponding first positioning aperture on the mold cup of the mold base for the positioning of the supporting pieces. The present invention also provides a mold base and supporting pieces for use with the light-emitting diode packaging apparatus.

35 Claims, 11 Drawing Sheets

LIGHT-EMITTING DIODE PACKAGING APPARATUS, MOLD BASE AND SUPPORTING MEMBER THEREOF

BACKGROUND OF THE INVENTION

1. Field of the Invention

The present invention relates generally to light-emitting diode packaging technology, and more particularly to a light-emitting diode packaging apparatus, mold base of the light-emitting diode packaging apparatus, and supporting member applied to the light-emitting diode packaging apparatus.

2. Description of Related Art

Different from luminescence principle of incandescent lamps, light-emitting diodes (LEDs) emit light by applying currents on luminescent materials, which are accordingly called as cold light. As the LEDs have advantages of high durability, long life time, small volume, light weight, low power consumption and the LEDs do not contain hazardous substances such as mercury, solid state lighting using the LEDs has become a research focus of the global lighting industry and semiconductor industry. Generally, the LEDs can be applied in such as white lighting, indicator light, vehicle signal light, traffic light, flashlight, LED backlight module, projector light source, display and so on.

With development and application of high power LEDs having characteristics of smaller volume, high light density and maximum light extraction per unit area, the conventional LED matrix has been eliminated in LED lighting design and LED molding and packaging process has become a major factor in affecting luminescence efficiency of the high power LEDs. Particularly, when the LEDs are applied in industries such as vehicle light, signal light and traffic light that have some regulatory limitations and specifications on luminous intensity distribution and luminescence efficiency, high precision LED packaging is required. Taiwan Patent Publication No.326250, No.343036, and Certificate No. M285041 disclose designs related to LED packaging apparatus.

Referring to FIG. 1, a conventional LED packaging apparatus is used for a plurality of supporting pieces 11 of a supporting member 1 to be inserted therein for the subsequent molding and packaging process. All the supporting pieces 11 are arranged at interval and connected together by two connecting sheets 13. Each of the supporting pieces 11 has a pair of electrode pins 111 for electrically coupling with LEDs. The LED packaging apparatus substantially comprises a mold base 2 and a mold base carrier (not shown) for carrying the mold base 2. The mold base 2 comprises a silicon steel sheet 21 into which the supporting pieces 11 of the supporting member 1 can be inserted, a plurality of mold cups 23 fixed to the silicon steel sheet 21 at interval, a plurality of V-shaped stands 25 disposed on the silicon steel sheet 21 between adjacent mold cups 23, and guiding columns 27 disposed at two sides of the silicon steel sheet 21 and comprising guiding slots 271 for guiding the supporting member 1.

After the supporting member 1 is inserted into the mold base 2 and positioned thereto, processes of molding, roasting and mold releasing can be sequentially performed on the mold cups 23 so as to complete the packaging process. However, as the supporting pieces 11 of the supporting member 1 is indirectly positioned in front/back/right/left directions by the connecting sheets 13, the stands 25 and the guiding slots 271 of the guiding columns 27 instead of being directly positioned on the silicon steel sheet 21, the accumulated tolerances may cause problems such as package misalignment and unstable structure, especially if the guiding columns 27 are made of a plastic material. As the plastic material only has an injection precision of 0.2 mm, compared with 0.001 mm stamping precision of the silicon steel sheet, not only the accumulated tolerance is big, the expansion coefficient difference and softening phenomenon occurring during the roasting process also exacerbate the package misalignment problem. Further, the wearing of the guiding columns 27 of plastic material caused by repeatedly mold releasing processes can worsen the package misalignment problem, thereby resulting in low packaging yield and high fabrication cost.

Accordingly, Taiwan Patent Publication No.326250 discloses a positioning structure for LED packaging apparatus. As shown in FIG. 2, the LED packaging apparatus also comprises a mold base 4 and a mold base carrier (not shown) for carrying the mold base 4. The mold base 4 comprises a silicon steel sheet 41 into which the supporting member 3 can be inserted, a plurality of mold cups 43 fixed to the silicon steel sheet 41 at interval, and a plurality of V-shaped stands 45 disposed on the silicon steel sheet 41 between adjacent mold cups 43. Therein, the above-mentioned guiding columns 27 are omitted in the present patent. The plurality of supporting pieces 31 of the supporting member 3 are connected at interval to the two connecting sheets 33, and each of the supporting pieces 31 has a pair of electrode pins 311 for electrically coupling with LEDs. In addition, a clipping sheet 35 is formed between every two adjacent supporting pieces 31 by stamping such that when the supporting member 3 is disposed across the stands 45, the clipping sheets 35 can be crossly engaged with the Y-shaped stands 45, thereby positioning the supporting member 3 in front/back/right/left/down directions. Although the structure of the present patent is simple, because of the omitting of the guiding columns, the positioning of the supporting member 3 is easy to deflect. Meanwhile, as the supporting member 3 is not positioned in the up direction, the depth of the supporting member 31 can be changed and the structure can be unstable, thereby increasing or decreasing the luminescent angle of LEDs.

To overcome the above drawbacks, a controller is disclosed in Taiwan Certificate No.M285041. As shown in FIG. 3, the supporting member 1 and the mold base 2 are same as those in FIG. 1. The supporting member 1 comprises a plurality of supporting pieces 11 arranged at interval and connected together by two connecting sheets 13. Each of the supporting pieces 11 has a pair of electrode pins 111 for electrically coupling with LEDs. The LED packaging apparatus substantially comprises a mold base 2 and a mold base carrier 29 for carrying the mold base 2. The mold base 2 comprises a silicon steel sheet 21 into which the supporting pieces 11 of the supporting member 1 can be inserted, a plurality of mold cups 23 fixed to the silicon steel sheet 21 at interval, a plurality of V-shaped stands 25 disposed on the silicon steel sheet 21 between any two adjacent mold cups 23, and guiding columns 27 disposed at two sides of the silicon steel sheet 21 and comprising guiding slots 271 for guiding the supporting member 1. The design of the present patent is characterized in a controller 28 having a slot 281, wherein the controller 28 is pressed against the top of the supporting member 1 and fixed by the guiding columns 27.

Although the supporting member 1 can be positioned in up/down directions through the controller 28, the problem of accumulated tolerances still exists. That is, the accumulated tolerances caused by indirect positioning of the supporting member 1 on the silicon steel sheet 21 can lead to such problems as package misalignment and unstable structure. Especially if the guiding columns 27 are made of a plastic material only having injection precision of 0.2 mm, compared with 0.001 mm stamping precision of the silicon steel sheet, not only accumulated tolerance is big, the expansion coefficient difference and softening phenomenon occurring during the roasting process under the temperature of 150° C. also exacerbate the misalignment problem. Further, the wearing of the guiding columns 27 of plastic material caused by repeatedly mold releasing processes can worsen the package misalignment problem, thereby resulting in low packaging yield and high fabrication cost.

Therefore, how to overcome the above drawbacks has become critical.

SUMMARY OF THE INVENTION

According to the above drawbacks, an objective of the present invention is to provide a LED packaging apparatus, mold base and supporting member, which can improve positioning precision.

Another objective of the present invention is to provide a LED packaging apparatus, mold base and supporting member, which can improve the product yield.

In order to attain the above and other objectives, the present invention provides a mold base of a LED packaging apparatus, comprising: a main body having a plurality of receiving portions arranged at interval; and a plurality of mold cups for holding encapsulant correspondingly fixed to the receiving portions of the main body, wherein a first positioning aperture is disposed at least at one side of each of the mold cups.

A rib can be disposed at least at one side of each of the mold cups, and the first positioning apertures are located inside the ribs and penetrating the main body. Preferably, two ribs are respectively disposed at two sides of each of the mold cups and each of the rib has a first positioning aperture penetrating the main body. The receiving portions are through holes corresponding in shape to the mold cups. The main body can be of a sheet-shaped structure or a block-shaped structure, wherein the main body of sheet-shaped structure can be made of silicon steel sheet, the main body of block-shaped structure can be made of ceramic block, steel block or aluminum block. The main body can further comprise second positioning apertures disposed at two sides thereof such that a controller can be inserted to the second positioning apertures.

In addition, the main body can further comprise at least a supporting portion disposed between any two adjacent receiving portions for supporting a supporting member. Preferably, the supporting portion is a stand protrudingly disposed on the main body, and a guiding interface is disposed on the top of the supporting portion for guiding and supporting the supporting member. Therein, the guiding interface can be a V-shaped guiding interface or a Y-shaped guiding interface.

The mold base can further comprise a holding member having a holding portion for horizontally holding the main body. Preferably, the holding portion is a slot formed at one side of the holding member. The holding member can have an U-shaped section structure and the holding portion is disposed close to the top of the holding member.

The present invention further provides a supporting member applied to a LED packaging apparatus, comprising: a plurality of supporting pieces arranged at interval, some of which respectively have a pair of electrode pins for electrically coupling with LEDs, and a positioning foot is formed at periphery of at least one of the pair of electrode pins; and at least two connecting sheets arranged at interval and connected to the supporting pieces.

In a preferred embodiment, a positioning foot is formed at peripheries of each of the pair electrode pins. The positioning foot can be directly connected to the periphery of the electrode pin. Alternatively, the positioning foot can be connected to the connecting sheets and be located at periphery of the electrode pin. Furthermore, the supporting member can comprise a metal sheet connected to one side surface of the supporting pieces, the positioning feet are connected to the metal sheet and located at peripheries of the electrode pins.

The present invention further provides a LED packaging apparatus, which is used for a supporting member having a plurality of supporting pieces to be inserted therein such that a molding packaging process can be performed, each of the supporting pieces has a pair of electrode pins for electrically coupling with LEDs, and a positioning foot is formed at periphery of at least one electrode pin of each of the supporting pieces. The LED packaging apparatus comprises: a mold base for the supporting member to be inserted therein, which at least has a main body and a plurality of mold cups for holding encapsulant, wherein the main body has a plurality of receiving portions arranged at interval corresponding to the mold cups for fixing the mold cups, and a first positioning aperture is disposed at least at one side of each of the mold cups; and a controller of a frame structure, wherein the controller comprises a positioning slot located at an inner side thereof for positioning the supporting member, and inserting portions disposed at two ends thereof for inserting into the main body.

A rib is disposed at least at one side of each of mold cups, and the first positioning apertures are located inside the ribs and penetrating the main body. Preferably, two ribs are respectively disposed at two sides of each of the mold cups and each of the rib has a first positioning aperture penetrating the main body. The receiving portions are through holes corresponding in shape to the mold cups. The main body has one of the structures consisting of a sheet-shaped structure and a block-shaped structure, wherein the main body of sheet-shaped structure can be made of silicon steel sheet, and the main body of block-shaped structure can be made of ceramic block, steel block or aluminum block. The main body further comprises second positioning apertures disposed at two sides thereof for the inserting portions of the controller to be inserted thereto. Preferably, each of the inserting portions is a convex body, width of which is smaller than that of the controller. Oppositely, the main body can have convex bodies disposed at two sides thereof such that the inserting portions of the controller can be inserted to the convex bodies. The inserting portions are inserting holes corresponding to the convex bodies, width of the inserting holes being greater than that of the positioning slot. The controller has a reverse U-shaped metallic frame structure with positioning slots disposed in inner sides thereof.

In addition, the main body can further comprise at least a supporting portion disposed between any two adjacent receiving portions for supporting the supporting member. Preferably, the supporting portion is a stand protrudingly disposed on the main body, and a guiding interface is disposed on the top of the supporting portion for guiding and supporting the supporting member. The guiding interface can be a V-shaped guiding interface or a Y-shaped guiding interface.

The mold base can further comprise a holding member having a holding portion for horizontally holding the main body. Preferably, the holding portion is a slot formed at one side of the holding member, wherein the holding member has an U-shaped section structure and the holding portion is disposed close to the top of the holding member.

Therefore, by combining the positioning feet of the supporting member with the first positioning apertures of the main body, the LED packaging apparatus, mold base and supporting member of the present invention provide a direct positioning effect that uses the main body as a positioning reference, thus overcoming the conventional problems such as accumulated tolerances, package misalignment and unstable structure. Thus, the positioning precision is improved, and the production yield is increased.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification. The present invention can also be performed or applied by other different embodiments. The details of the specification may be on the basis of different points and applications, and numerous modifications and variations can be made without departing from the spirit of the present invention.

Figure 1:
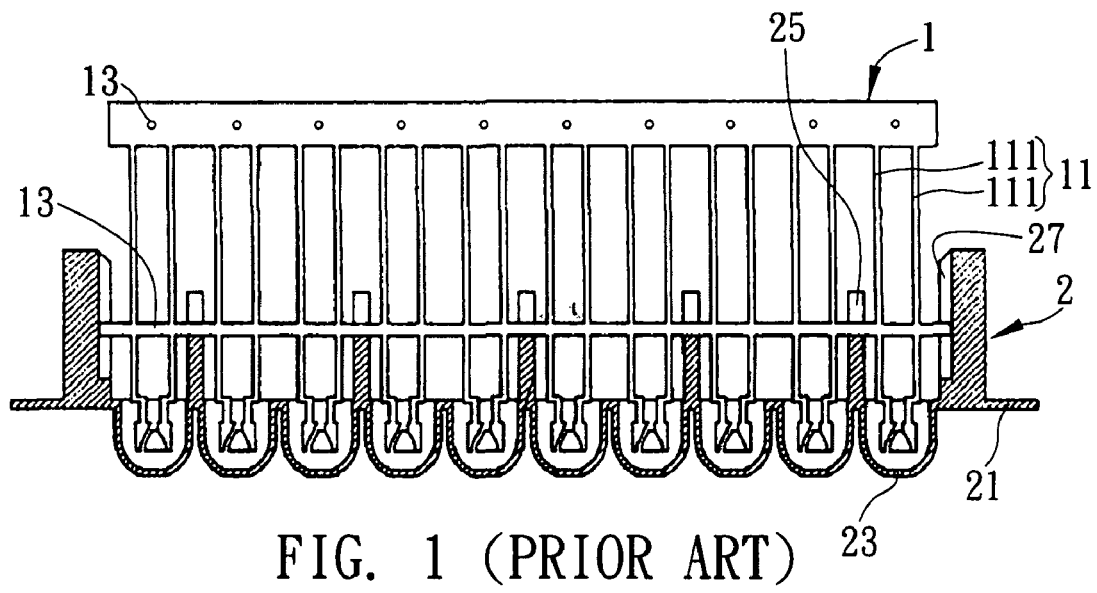
FIG. 1 is a side sectional view of a conventional LED packaging apparatus.
Figure 2:
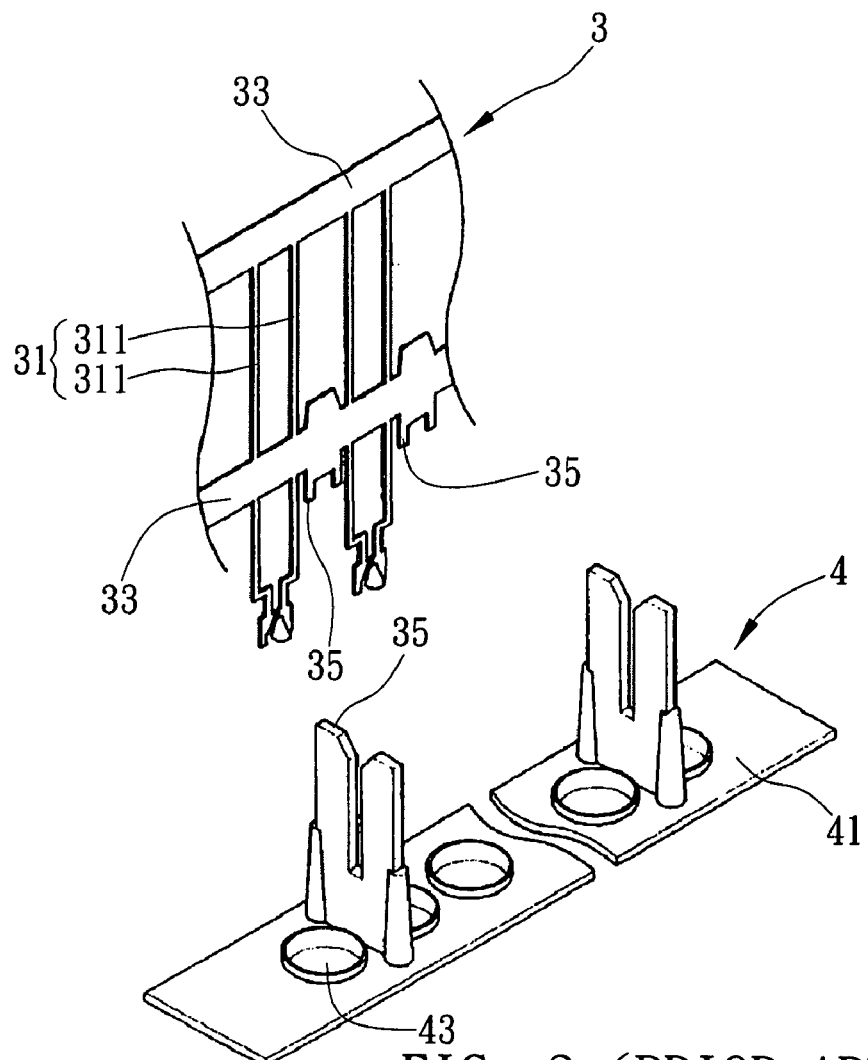
FIG. 2 is a diagram of a LED packaging apparatus disclosed by Taiwan Patent Publication No.326250.
Figure 3:
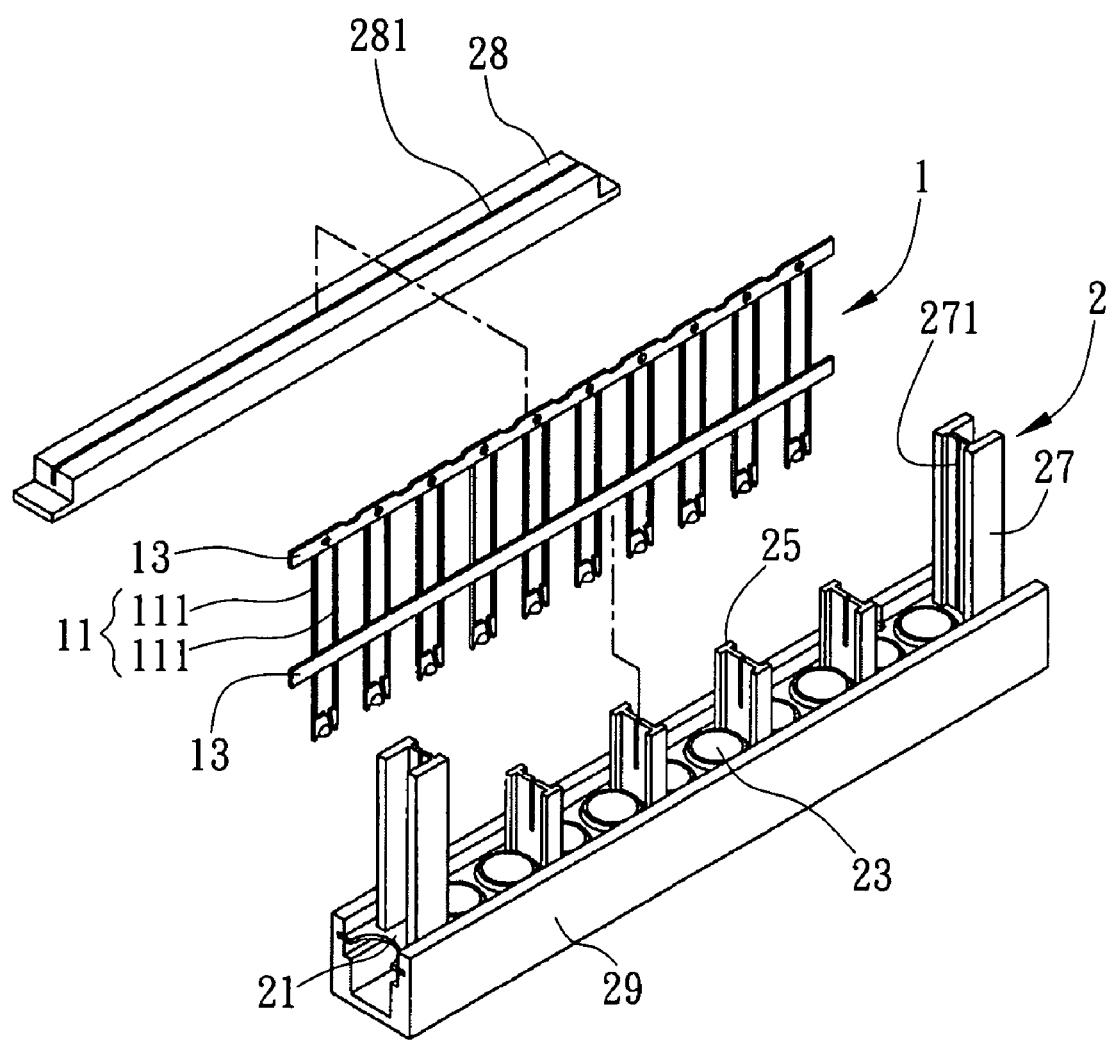
FIG. 3 is a diagram of a LED packaging apparatus disclosed by Taiwan Certificate No.M285041.
Figure 4:
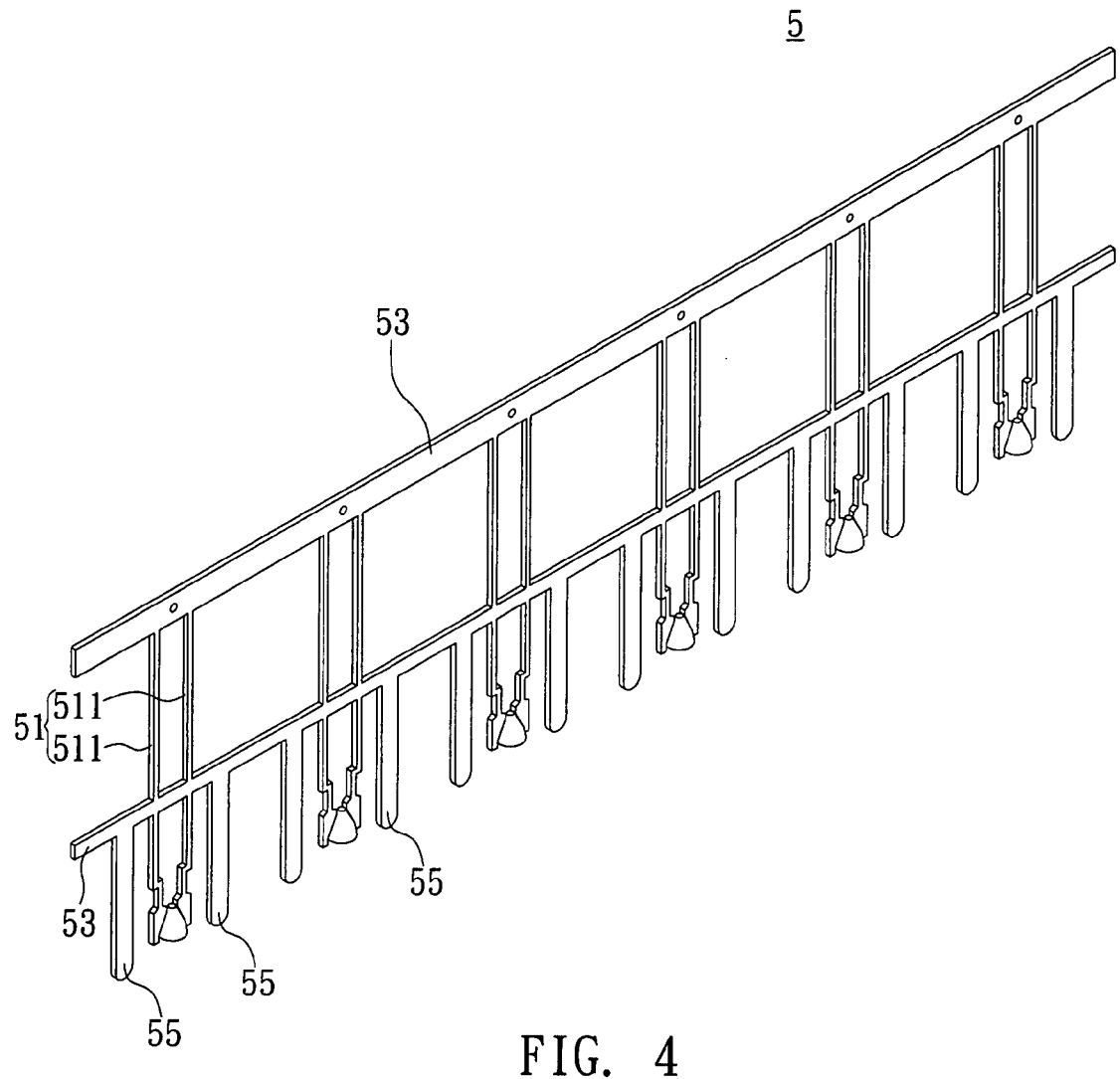
FIG. 4 is a diagram of a supporting member to be applied to a LED packaging apparatus according to the present invention.

Referring to FIG. 4, a supporting member used in a LED packaging apparatus of the present invention is shown. The supporting member 5 comprises a plurality of supporting pieces 51 and at least two connecting sheets 53. Therein, all the supporting pieces 51 are arranged at interval. Some supporting pieces 51 respectively have a pair of electrode pins 511 for electrically coupling with LEDs, wherein, a positioning foot 55 is formed at periphery of at least one of the pair of electrode pins 511. The supporting pieces 51 are connected to the connecting sheets 53 arranged at interval from each other.

In the present embodiment, at periphery of each of the electrode pins 511, there is formed a positioning foot 55, and all the positioning feet 55 are connected to one of the connecting sheets 53. But those skilled in the art will understand that the number and connecting position of the positioning feet are not limited to the present embodiment. For example, the positioning foot 55 can be formed only at periphery of one of every pair of electrode pins 511, or can be directly connected to the periphery of the electrode pin 511.

Figure 5A:
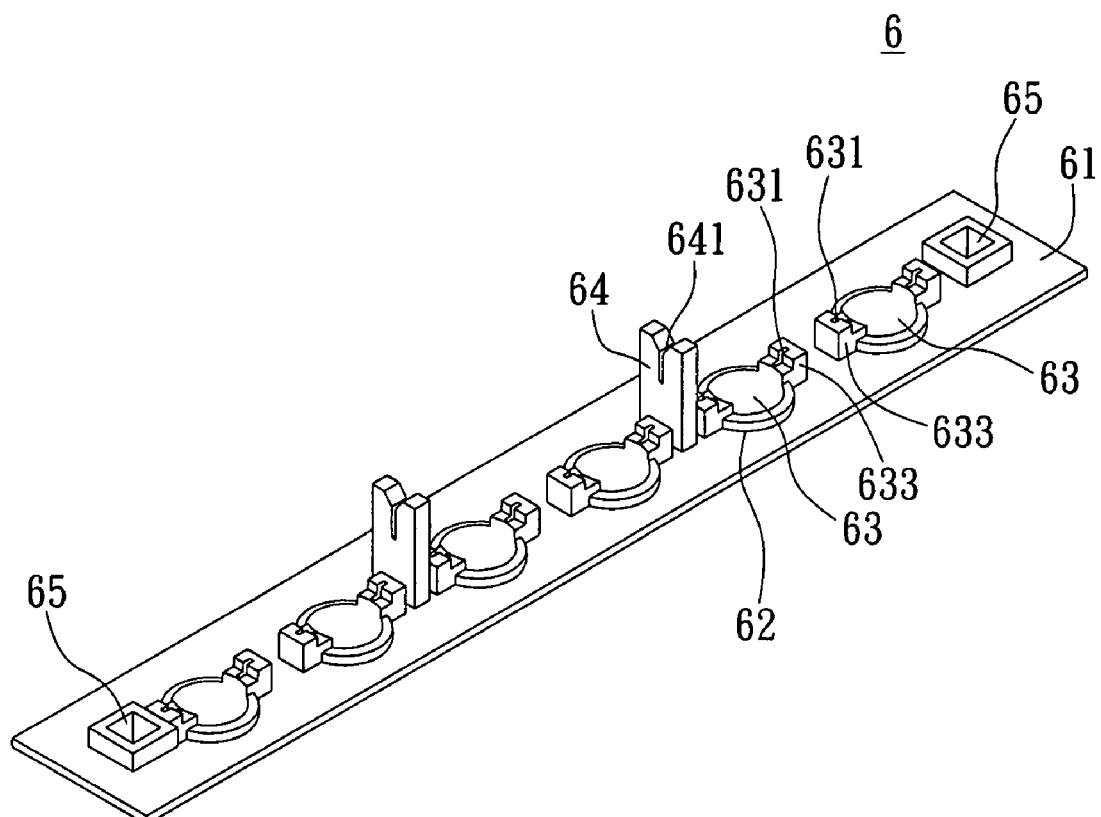
FIG. 5A is a diagram of a mold base of a LED packaging apparatus according to the present invention.
Figure 11:
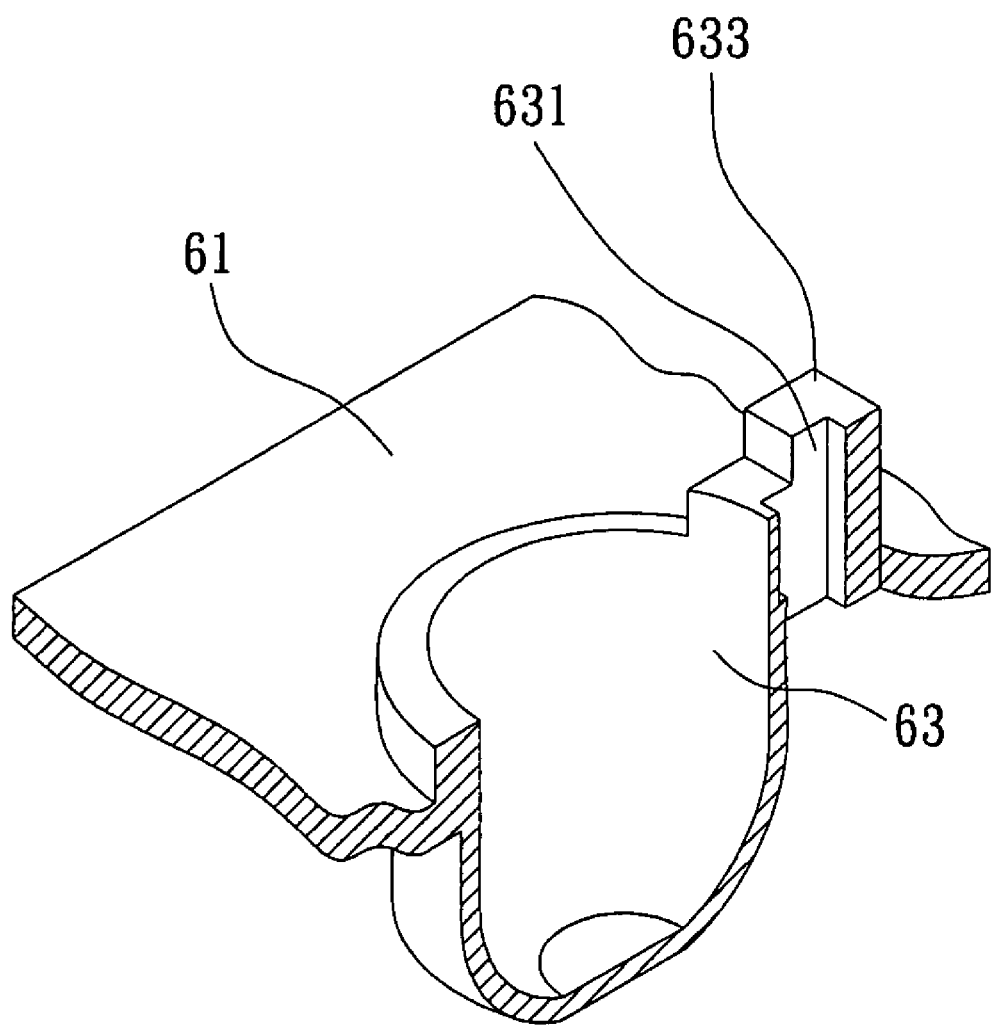
FIG. 11 is a diagram of a supporting member according to another embodiment of the present invention.

FIG. 5A shows a mold base of a LED packaging apparatus. As shown in FIG. 5A, the mold base 6 comprises a sheet-shaped main body 61 and a plurality of mold cups 63 for holding encapsulant. The sheet-shaped main body 61 has a plurality of receiving portions 62 arranged at interval, and the mold cups 63 are correspondingly fixed to the receiving portions 62. A first positioning aperture 631 is formed at least at one side of each of the mold cups 63, or formed at one side of the mold cup 63, as shown in FIG. 11, but it is not limited thereto. The number of the first positioning apertures 631 can be changed according to the practical need. For example, a first positioning aperture 631 can be formed at least at one side of every two mold cups 63.

Figure 5B:
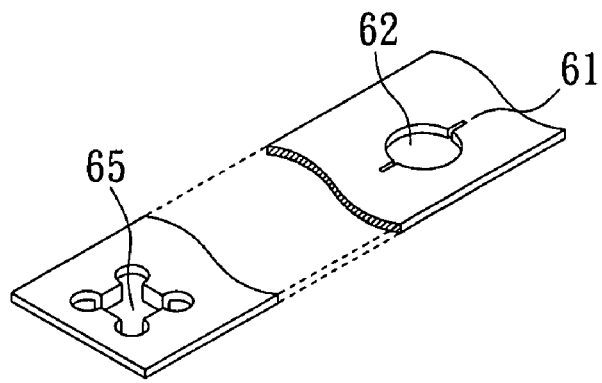
FIG. 5B is a diagram of a main body of a mold base of a LED packaging apparatus according to the present invention.

Referring to FIGS. 5A and 5B, the sheet-shaped main body 61 can be made of silicon steel sheet. The receiving portions 62 can be through holes corresponding in shape to the mold cups 63. Two ribs 633 are respectively formed at two sides of each of the mold cups 63, and each of the ribs 633 has a first positioning aperture 631 penetrating through the main body 61. Those skilled in the art can change the number and connecting positions of the ribs according to the practical need. For example, the ribs 633 can be formed only at one side of each of the mold cups 63.

In addition, to enhance the positioning effect, the main body 61 can further comprise at least a supporting portion 64 disposed between any two adjacent receiving portions 62 for supporting the supporting member 5. In the present embodiment, the supporting portion 64 can be a stand protrudingly disposed on the main body 61, which has a Y-shaped guiding interface 641 disposed at the top thereof for guiding and supporting the supporting member. In other embodiment, the guiding interface 641 can be V-shaped. The main body 61 further comprises second positioning apertures 65 disposed at two sides thereof such that a specified controller to be described later can be inserted therein.

The receiving portions 62 can be through holes corresponding in shape to the mold cups 63 and the first positioning apertures 631. The second positioning apertures 65 are used for a controller to be inserted therein, which substantially has a rectangular shape as shown in FIG. 5B. In practice, to stamp the main body 61 of the silicon steel sheet, corners of the main body 61 are generally punched first for preventing stress concentration and a part of edges formed during punching are left without being removed. Then through an injection molding process, the depth of the second positioning apertures 65 can be extended to some degree, thereby increasing controller inserting precision and increasing stability effect.

Figure 5C:
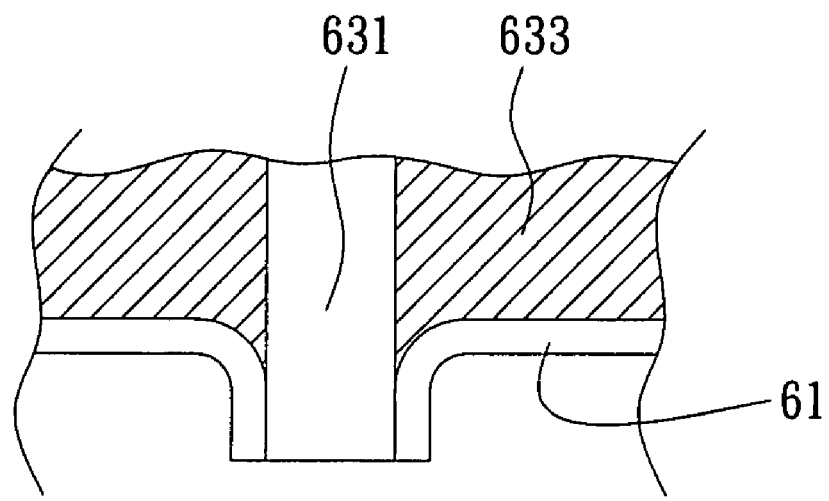
FIGS. 5C and 5D are diagrams of first positioning apertures of the mold base according to two different embodiments of the present invention.

The abovementioned method also can be used in forming the first positioning apertures 631. As shown in FIG. 5C, the first positioning apertures 631 are formed together with the receiving portions 62 by punching the main body 61. Part of the edges formed during punching can be left without being removed according to the precision requirement of the first positioning apertures 631. Meanwhile, by being aligned with the receiving portions 62, ribs 633 formed at sides of the mold cups 63 by injection molding completely encapsulate the receiving portions 62. Thus, the main body 61 is used as a positioning reference of the first positioning apertures 631, thereby eliminating the problem of accumulated tolerances of the prior art.

Figure 5D:
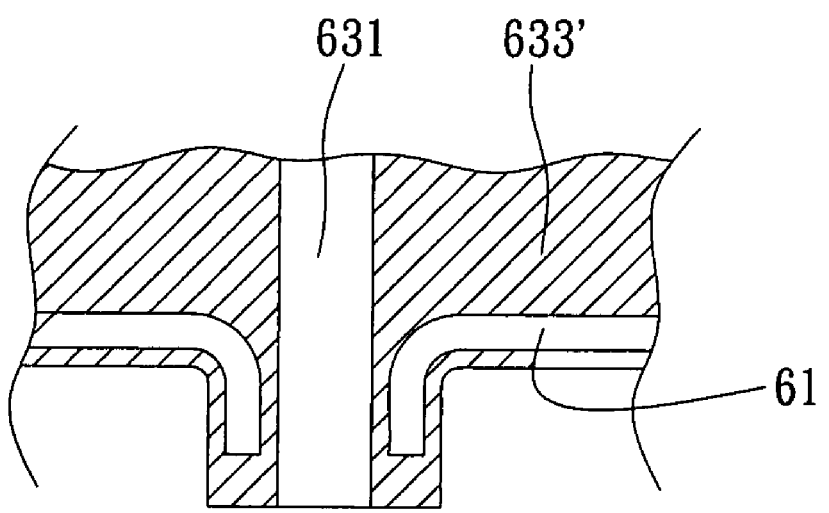

Alternatively, as shown in FIG. 5D, the first positioning apertures 631 are formed together with the receiving portions 62 by punching the main body 61. Part of the edges formed during punching can be left without being removed. Meanwhile, ribs 633' formed at sides of the mold cups 63 by injection molding completely encapsulate the receiving portions 62. Thus, both the main body 61 and the mold cups 63 are used as the positioning references of the first positioning apertures 631, which also overcome the conventional problem of accumulated inaccuracy.

Figure 6:
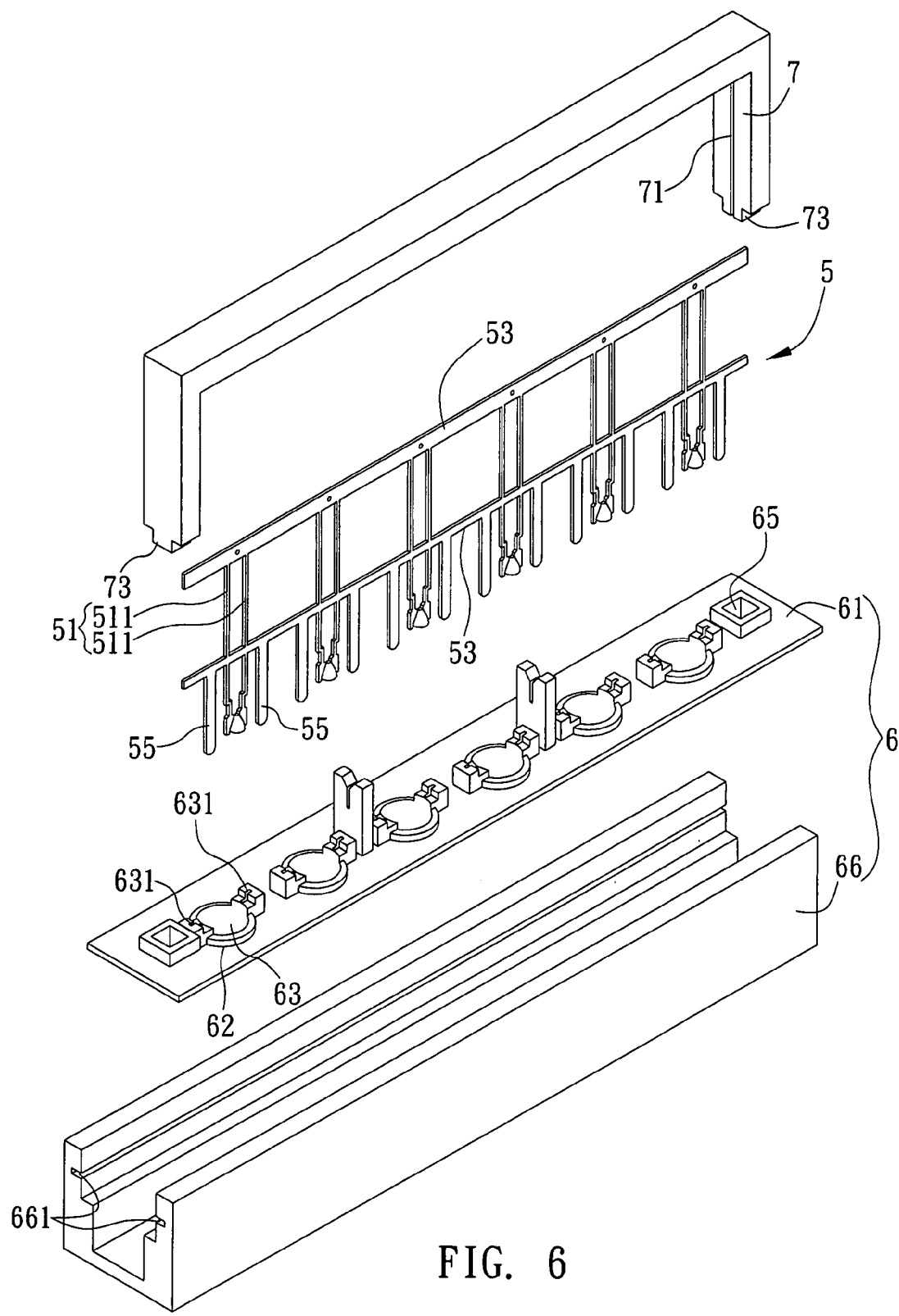
FIG. 6 shows a disassembled state of the LED packaging apparatus according to the present invention.
Figure 7A:
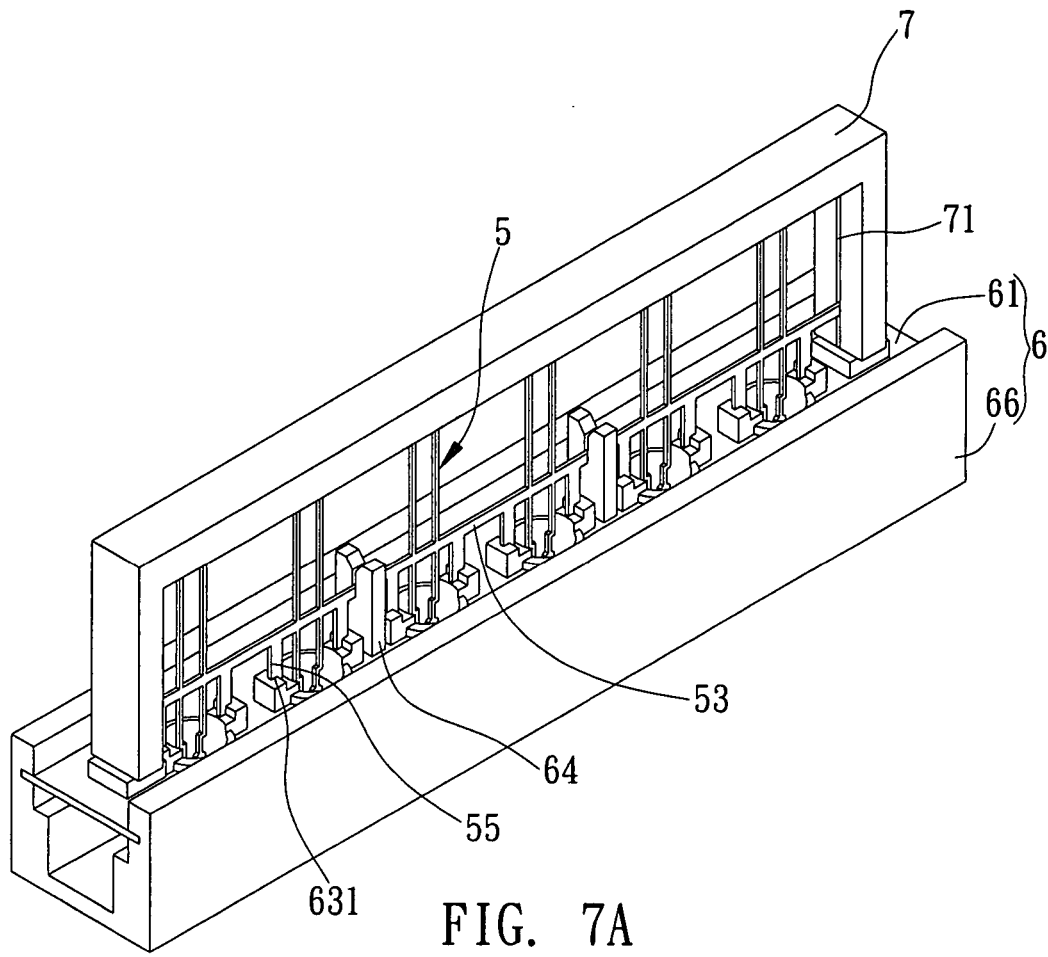
FIG. 7A shows an assembly state of the LED packaging apparatus according to the present invention.

Referring to FIGS. 6 and 7A, a disassembled state and an assembly state of the LED packaging apparatus are shown. As mentioned before, the LED packaging apparatus is used for a supporting member 5 having a plurality of supporting pieces 51 to be inserted therein such that a molding packaging process can be performed. Each of the supporting pieces 51 has a pair of electrode pins 511 for electrically coupling with LEDs. A positioning foot 55 is formed at periphery of at least one of the electrode pins 511 of each of the supporting pieces 51. The LED packaging apparatus comprises such as a mold base 6 and a controller 7.

The mold base 6 is used for the supporting member 5 to be inserted therein. The mold base 6 comprises at least a main body 61 and a plurality of mold cups 63 for holding encapsulant. The main body 61 has a plurality of receiving portions 62 arranged at interval corresponding to the mold cups 63. Each of the mold cups 63 has a first positioning aperture 631 disposed at least at one side thereof such that a positioning foot 55 can be inserted to the first positioning aperture 631. The main body 61 further comprises second positioning apertures 65 disposed at two sides thereof. In addition, the mold base can further comprise a holding member 66 having holding portions 661 for horizontally holding the main body 61. In the present embodiment, the holding member 66 has a U-shaped section structure. The holding portions 661 are slots horizontally formed at two sides of the holding member 66 and close to the top of the holding member 66. As the supporting member 5 and the mold base 6 are substantially same as those in FIGS. 4 and 5, detailed description of them is omitted.

The controller 7 is of a frame structure. The controller 7 comprises positioning slots 71 formed at inner sides thereof for positioning the supporting member 5, and inserting portions 73 formed at two ends thereof for inserting to the second positioning apertures 65 of the main body 61. In the present embodiment, the controller 7 has a reverse U-shaped metallic frame structure with the positioning slots 71 formed at inner sides thereof. The inserting portions 73 are convex bodies having a smaller width than that of the controller 7 for precisely controlling the positioning depth of the inserting portions 73 inserted into the second positioning apertures 65.

Before performing the molding packaging process, the supporting member 5 is inserted into the mold base 6 with the positioning feet 55 inserted into the first positioning apertures 631 of the main body 61, thereby directly fixing the supporting member 5 in front/back/left/right directions by using the main body 61 as a positioning reference. In addition, the supporting portion 64 is used to support one of the connecting sheets 53. Thus, the package misalignment problem caused by indirect positioning method of the prior art is overcome. By inserting the controller 7 to the second positioning apertures 65 of the main body 61, the supporting member is positioned in up/down directions and accordingly the problem of unstable structure caused by indirect positioning method of the prior art is overcome, thus increasing the positioning precision and production yield.

Figure 7B:
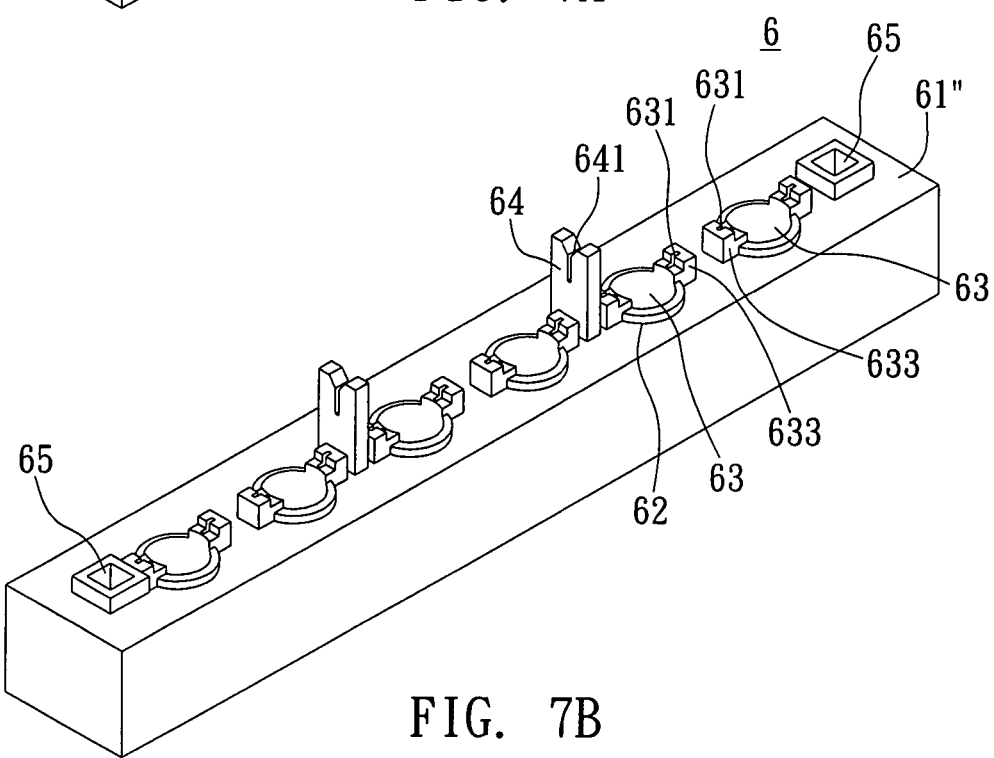
FIG. 7B is a diagram of a mold base according to another embodiment of the present invention.

It should be noted that the mold base 6 is not limited to the said structure. The main body 61 can be disposed on holding members of different structures, and the main body and the holding member can be integrally formed. As shown in FIG. 7B, the mold base 6 comprises a main body 61" of block structure and a plurality of mold cups 63, wherein the main body 61" comprises a plurality of receiving portions 62 arranged at interval corresponding to the mold cups 63. Each of the mold cups 63 has a first positioning aperture 631 formed at least at one side thereof. The receiving portions 62 are through holes corresponding in shape to the mold cups 63. Two ribs 633 are disposed at two sides of each of the mold cups 63, and each of the ribs 633 has a first positioning aperture 631 penetrating the main body 61". The main body 61" can be a ceramic block, a steel block or an aluminum block.

Figure 8:
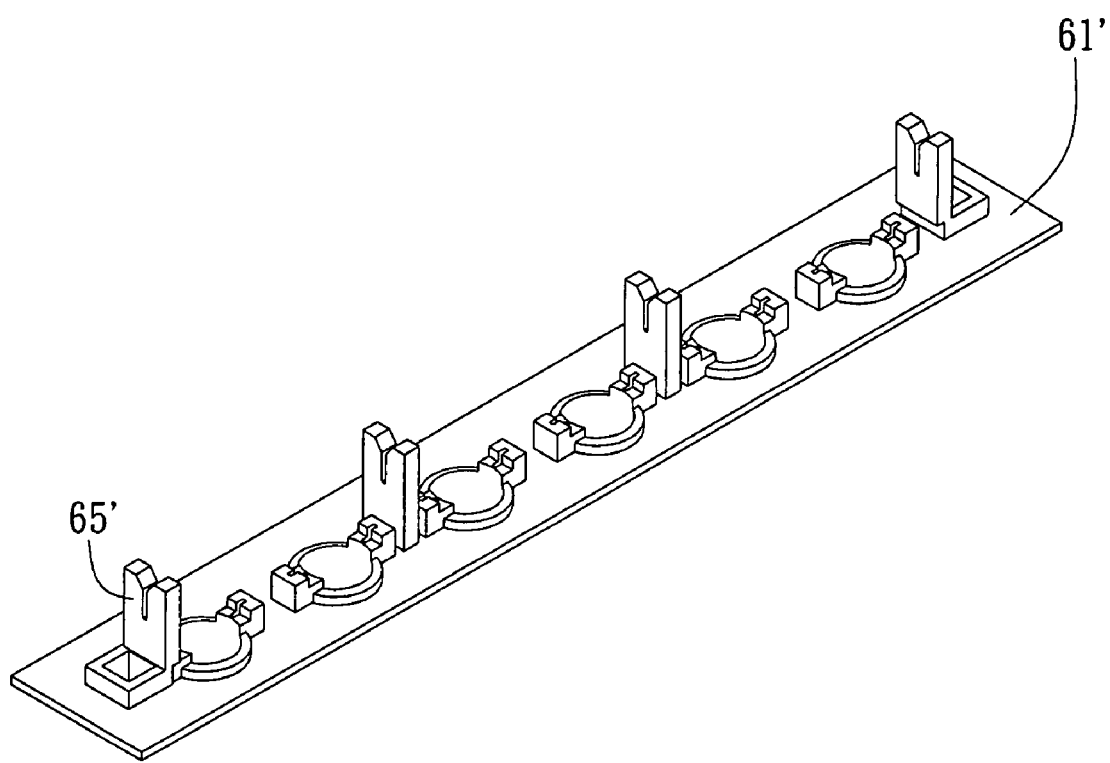
FIG. 8 is a diagram of a mold base according to another embodiment of the present invention.
Figure 9:
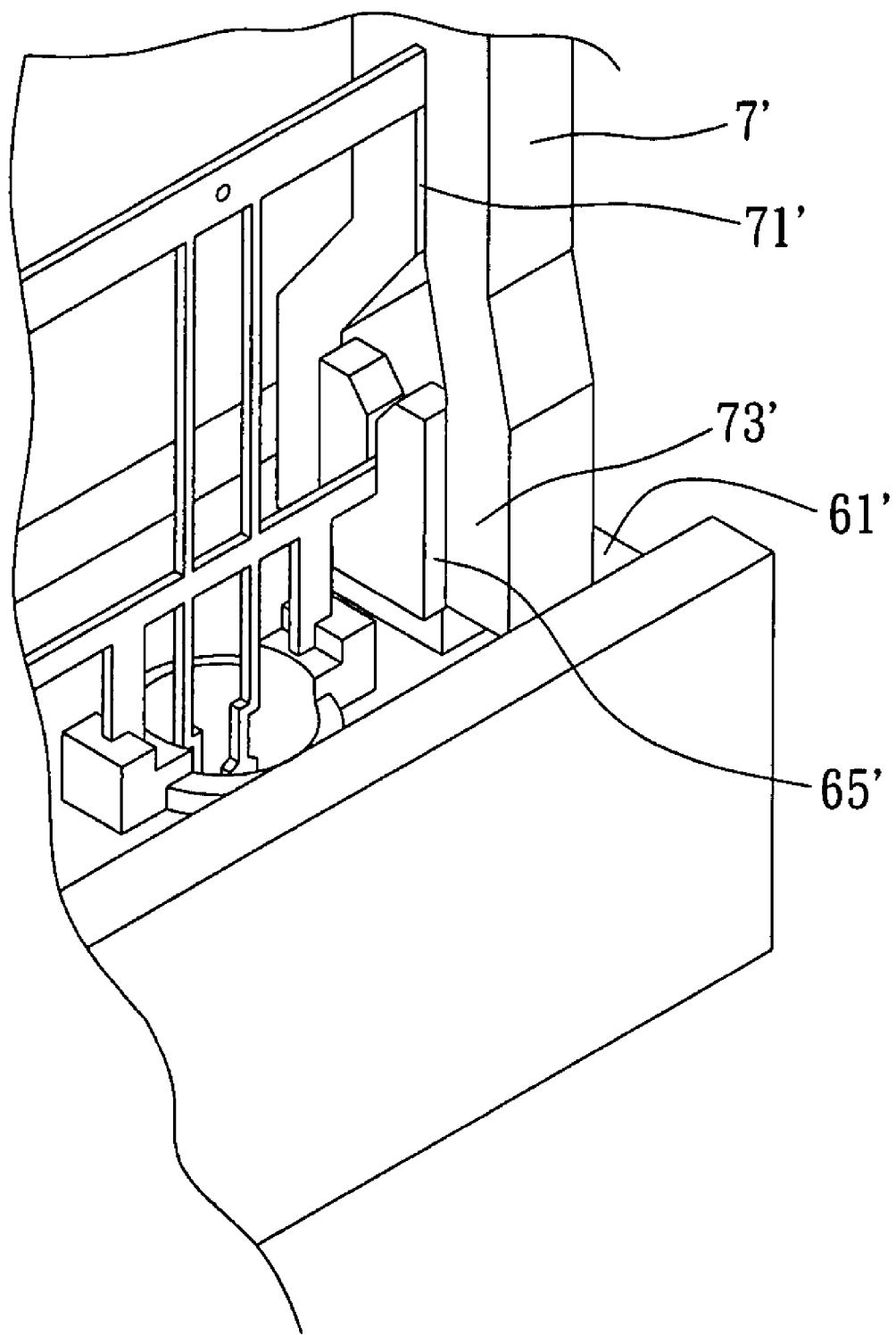
FIG. 9 shows an assembly state of the LED packaging apparatus using the mold base of FIG. 8.

FIGS. 8 and 9 show a mold base and a LED apparatus using the mold base according to another embodiment of the present invention, wherein components same as or similar to the above embodiment are denoted by same or similar component numerals, and detailed description of them is omitted.

As a main difference, structures of the controller and the second positioning apertures of the present embodiment are reverse to those of the above embodiment.

As shown in FIGS. 8 and 9, the main body 61' has two convex bodies 65' disposed at two sides thereof, wherein the convex bodies 65' can be integrated with supporting portions. Corresponding to the convex bodies 65', the inserting portions 73' of the controller 7' have inserting holes, width of which is greater than that of the positioning slots 71'.

Figure 10:
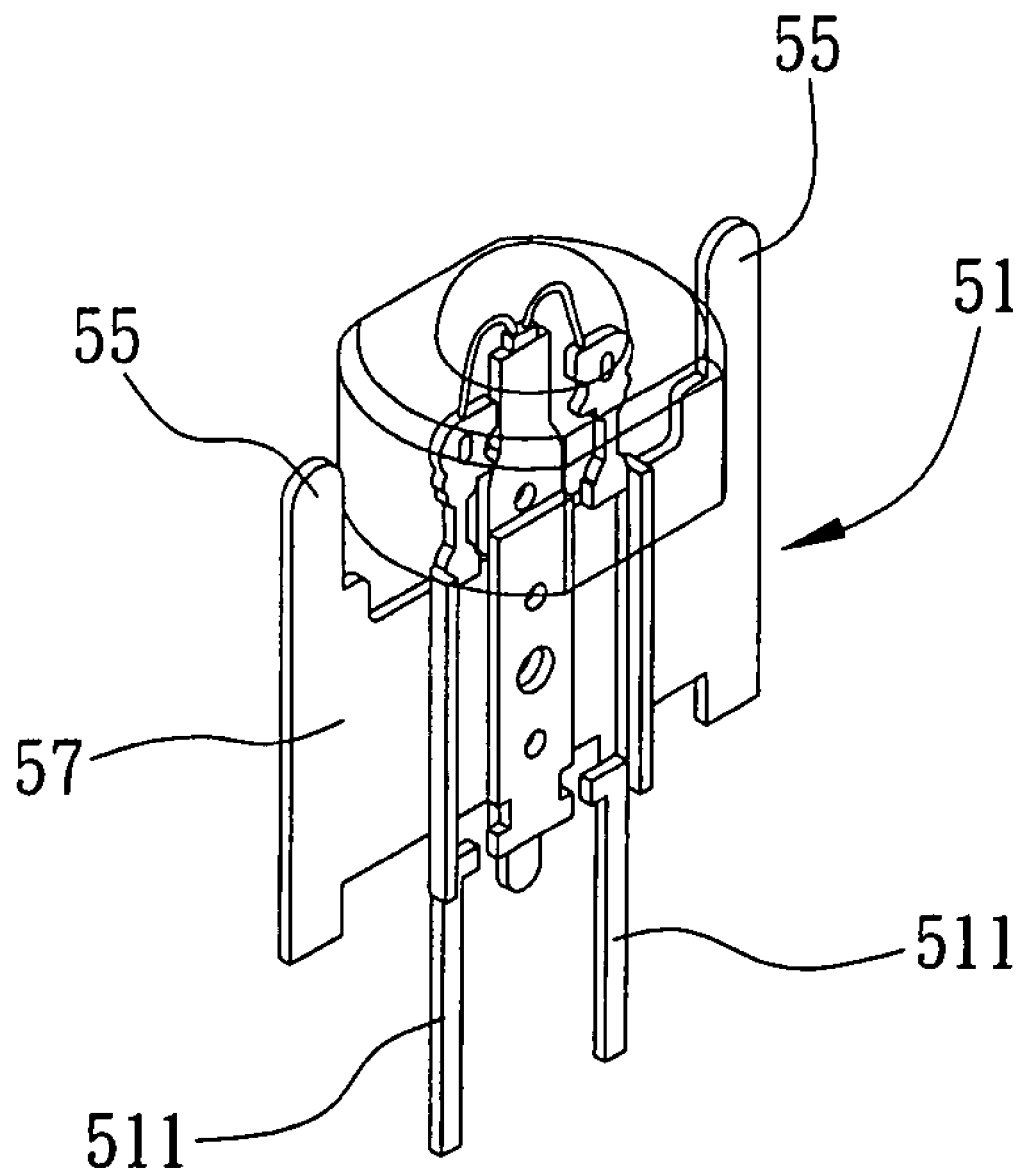
FIG. 10 is a diagram of a supporting member according to another embodiment of the present invention.

In addition, the supporting member 5 is not limited to the abovementioned structure in FIG. 4. To package high power LEDs, the supporting member 5 can have a laminated structure for increasing heat dissipating efficiency. As shown in FIG. 10, the supporting member further comprises a metal sheet 57 connected to one surface of the supporting pieces 51. The positioning feet 55 can be directly connected to the metal sheet 57 and disposed at periphery of the electrode pins 511.

Therefore, by combining the positioning feet of the supporting member with the first positioning apertures of the main body, the LED packaging apparatus, mold base and supporting member of the present invention provide a direct positioning effect that uses the main body as a positioning reference, thus overcoming the conventional problems such as accumulated tolerances, package misalignment and unstable structure. As a result, the positioning precision is improved, and the production yield is increased.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A mold base of an LED packaging apparatus, comprising:
   a main body having a plurality of receiving portions arranged at interval; and
   a plurality of mold cups for holding encapsulant correspondingly fixed to the receiving portions of the main body, wherein a first positioning aperture is disposed between any two adjacent ones of the mold cups.

2. The mold base of claim 1, wherein a rib is disposed at least at one side of each of the mold cups, and the first positioning apertures are located inside the ribs and penetrating the main body.

3. The mold base of claim 1, wherein two ribs are respectively disposed at two sides of each of the mold cups and each of the rib has the first positioning aperture penetrating the main body.

4. The mold base of claim 1, wherein the receiving portions are through holes corresponding in shape to the mold cups.

5. The mold base of claim 1, wherein the main body has one of the structures consisting of a sheet-shaped structure and a block-shaped structure.

6. The mold base of claim 5, wherein the main body of sheet-shaped structure can be made of silicon steel sheet.

7. The mold base of claim 1, wherein the main body comprise second positioning apertures disposed at two sides thereof such that a controller can be inserted to the second positioning apertures.

8. The mold base of claim 1, wherein the main body further comprises at least a supporting portion disposed between any two adjacent receiving portions for supporting a supporting member.

9. The mold base of claim 8, wherein the supporting portion is a stand protrudingly disposed on the main body, and a guiding interface is disposed on the top of the supporting portion for guiding and supporting the supporting member.

10. The mold base of claim 9, wherein the guiding interface is one of a V-shaped guiding interface and a Y-shaped guiding interface.

11. The mold base of claim 1, further comprising a holding member having a holding portion for horizontally holding the main body.

12. The mold base of claim 11, wherein the holding portion is a slot formed at one side of the holding member.

13. The mold base of claim 11, wherein the holding member has a U-shaped section structure and the holding portion is disposed close to the top of the holding member.

14. A supporting member applied to an LED packaging apparatus, comprising:
a plurality of supporting pieces arranged at interval, some of which respectively have plural pairs of electrode pins for electrically coupling with LEDs, and a positioning foot formed between and spatially separated from any two adjacent pairs of the electrode pins; and
at least two connecting sheets arranged at interval and connected to the supporting pieces.

15. The supporting member of claim 14, wherein the positioning foot is formed at peripheries of each of the plural pairs of electrode pins.

16. The supporting member of claim 14, wherein the positioning foot is connected to the periphery of the electrode pin.

17. The supporting member of claim 14, wherein the positioning foot is connected to the connecting sheets and located at periphery of the electrode pin.

18. The supporting member of claim 14, further comprising a metal sheet connected to one side surface of the supporting pieces, the positioning foot is connected to the metal sheet and located at peripheries of the electrode pins.

19. An LED packaging apparatus, which is used for a supporting member having a plurality of supporting pieces to be inserted therein such that a molding packaging process can be performed, each of the supporting pieces has a pair of electrode pins for electrically coupling with LEDs, and a positioning foot is formed at periphery of at least one electrode pin of each of the supporting pieces, the apparatus comprising:
a mold base for the supporting member to be inserted therein, which at least has a main body and a plurality of mold cups for holding encapsulant, wherein the main body has a plurality of receiving portions arranged at interval corresponding to the mold cups for fixing the mold cups, and a first positioning aperture is disposed between any two adjacent ones of the mold cups; and
a controller of a frame structure, wherein the controller comprises a positioning slot located at an inner side thereof for positioning the supporting member, and inserting portions disposed at two ends thereof for inserting into the main body.

20. The apparatus of claim 19, wherein a rib is disposed at least at one side of each of the mold cups, and the first positioning apertures are located inside the ribs and penetrating the main body.

21. The apparatus of claim 19, wherein two ribs are respectively disposed at two sides of each of the mold cups and each of the rib has the first positioning aperture penetrating the main body.

22. The apparatus of claim 19, wherein the receiving portions are through holes corresponding in shape to the mold cups.

23. The apparatus of claim 19, wherein the main body has one of the structures consisting of a sheet-shaped structure and a block-shaped structure.

24. The apparatus of claim 23, wherein the main body of sheet-shaped structure can be made of silicon steel sheet.

25. The apparatus of claim 19, wherein the main body further comprises at least a supporting portion disposed between any two adjacent receiving portions for supporting the supporting member.

26. The apparatus of claim 25, wherein the supporting portion is a stand protrudingly disposed on the main body, and a guiding interface is disposed on the top of the supporting portion for guiding and supporting the supporting member.

27. The apparatus of claim 26, wherein the guiding interface is one of a V-shaped guiding interface and a Y-shaped guiding interface.

28. The apparatus of claim 19, wherein the mold base further comprises a holding member having a holding portion for horizontally holding the main body.

29. The apparatus of claim 28, wherein the holding portion is a slot formed at one side of the holding member.

30. The apparatus of claim 28, wherein the holding member has a U-shaped section structure and the holding portion is disposed close to the top of the holding member.

31. The apparatus of claim 19, wherein the main body further comprises second positioning apertures disposed at two sides thereof for the inserting portions of the controller to be inserted thereto.

32. The apparatus of claim 19, wherein each of the inserting portions is a convex body, width of which is smaller than that of the controller.

33. The apparatus of claim 19, wherein the main body further comprises convex bodies disposed at two sides thereof such that the inserting portions of the controller can be inserted to the convex bodies.

34. The apparatus of claim 33, wherein the inserting portions are inserting holes corresponding to the convex bodies, width of the inserting holes being greater than that of the positioning slot.

35. The apparatus of claim 19, wherein the controller has a reverse U-shaped metallic frame structure with positioning slots disposed in inner sides thereof.

* * * * *